United States Patent
Suzuki et al.

(10) Patent No.: US 8,843,007 B2
(45) Date of Patent: Sep. 23, 2014

(54) IMAGE FORMING APPARATUS WITH TONER DEPOSIT CONTROL AND PAPER INTERVAL CONTROL

(75) Inventors: Chikatsu Suzuki, Hachioji (JP); Masatoshi Hitaka, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 193 days.

(21) Appl. No.: 13/416,391

(22) Filed: Mar. 9, 2012

(65) Prior Publication Data
US 2012/0230712 A1 Sep. 13, 2012

(30) Foreign Application Priority Data

Mar. 11, 2011 (JP) ................................. 2011-054107

(51) Int. Cl.
*G03G 15/00* (2006.01)
*H04N 1/60* (2006.01)

(52) U.S. Cl.
CPC ......... *G03G 15/5058* (2013.01); *H04N 1/6036* (2013.01); *H04N 1/6097* (2013.01); *G03G 2215/00447* (2013.01); *G03G 15/6558* (2013.01)
USPC ................. 399/49; 399/45; 399/72

(58) Field of Classification Search
USPC ..................... 399/30, 45, 49, 64, 72
See application file for complete search history.

(56) References Cited

U.S. PATENT DOCUMENTS

| | | | | |
|---|---|---|---|---|
| 2004/0002015 A1* | 1/2004 | Ozawa et al. | ................. | 430/122 |
| 2005/0265741 A1* | 12/2005 | Otsuka | ............. | 399/69 |
| 2006/0093419 A1* | 5/2006 | Kitamura | ...................... | 399/401 |
| 2009/0080919 A1* | 3/2009 | Okada | ............................ | 399/45 |
| 2009/0245828 A1* | 10/2009 | Ito | ................... | 399/49 |
| 2010/0290800 A1* | 11/2010 | Akiyama | ....................... | 399/66 |
| 2011/0222885 A1* | 9/2011 | Yamaki et al. | .................. | 399/66 |

FOREIGN PATENT DOCUMENTS

| | | |
|---|---|---|
| JP | 2004-184509 A | 7/2004 |
| JP | 2009-139561 A | 6/2009 |

* cited by examiner

*Primary Examiner* — David Gray
*Assistant Examiner* — Francis Gray
(74) *Attorney, Agent, or Firm* — Holtz Holtz Goodman & Chick PC

(57) ABSTRACT

An image forming apparatus includes a patch image generation unit which generates a patch image for image density detection disposed between toner images, and a patch density sensor which detects a density of the patch image. In order to prevent the output quality of a printed image from varying with the type of paper use, a correction unit performs correction processing to match a detected density and a target density by comparing the detected density of the patch image detected by the patch density sensor and the target density of the patch image which is set in advance, a toner deposit control unit controls a toner deposit when the image forming unit forms an image based upon image data and when the patch image generation unit generates the patch image, and a paper interval control unit controls an interval between consecutive papers.

7 Claims, 11 Drawing Sheets

| PAPER PROFILE | |
|---|---|
| No. | ITEM |
| 001 | PAPER SIZE<br>PAPER TYPE<br>BASIS WEIGHT<br>.<br>.<br>.<br>TONER DEPOSIT |
| 002 | ″ |
| 003 | ″ |
| ⋮ | |
| 500 | |

MACHINE CONDITION | JOB LIST | READING | COPY | SCAN

DOCUMENT COUNTER 0 | REMAINING MEMORY 99.000%
NUMBER OF RESERVED JOBS 0 | 2010/12/16 10:51

ⓘ PRESS [OK] TO FINALIZED SETTING
PRESS [CANCEL] FOR CANCELING

PAPER SETTING ▷ CALLING OF SETTING

CALLING OF SETTING — G1

PLEASE SELECT REGISTERED PAPER TYPE

| No.△ | PAPER PROFILE | PAPER SIZE | PAPER TYPE | BASIS WEIGHT | FRONT-BACK ADJUSTMENT | PROCESS |
|---|---|---|---|---|---|---|
| 001 | profile-001 | A4 | COATED PAPER GL | 136-162g/m² | NO | NO |
| 002 | profile-002 | A4 | REGULAR PAPER | 106-135g/m² | NO | NO |
| 003 | profile-002[ADDITIONAL PRINT] | A4 | REGULAR PAPER | 106-135g/m² | NO | NO |

◁ 1/1 ▷

[CONTENT CONFIRMATION] — A1

[CANCEL] — A3   [OK] — A2

PRINT DATA CAN BE RECEIVED | MATERIAL

D1, D2, D3

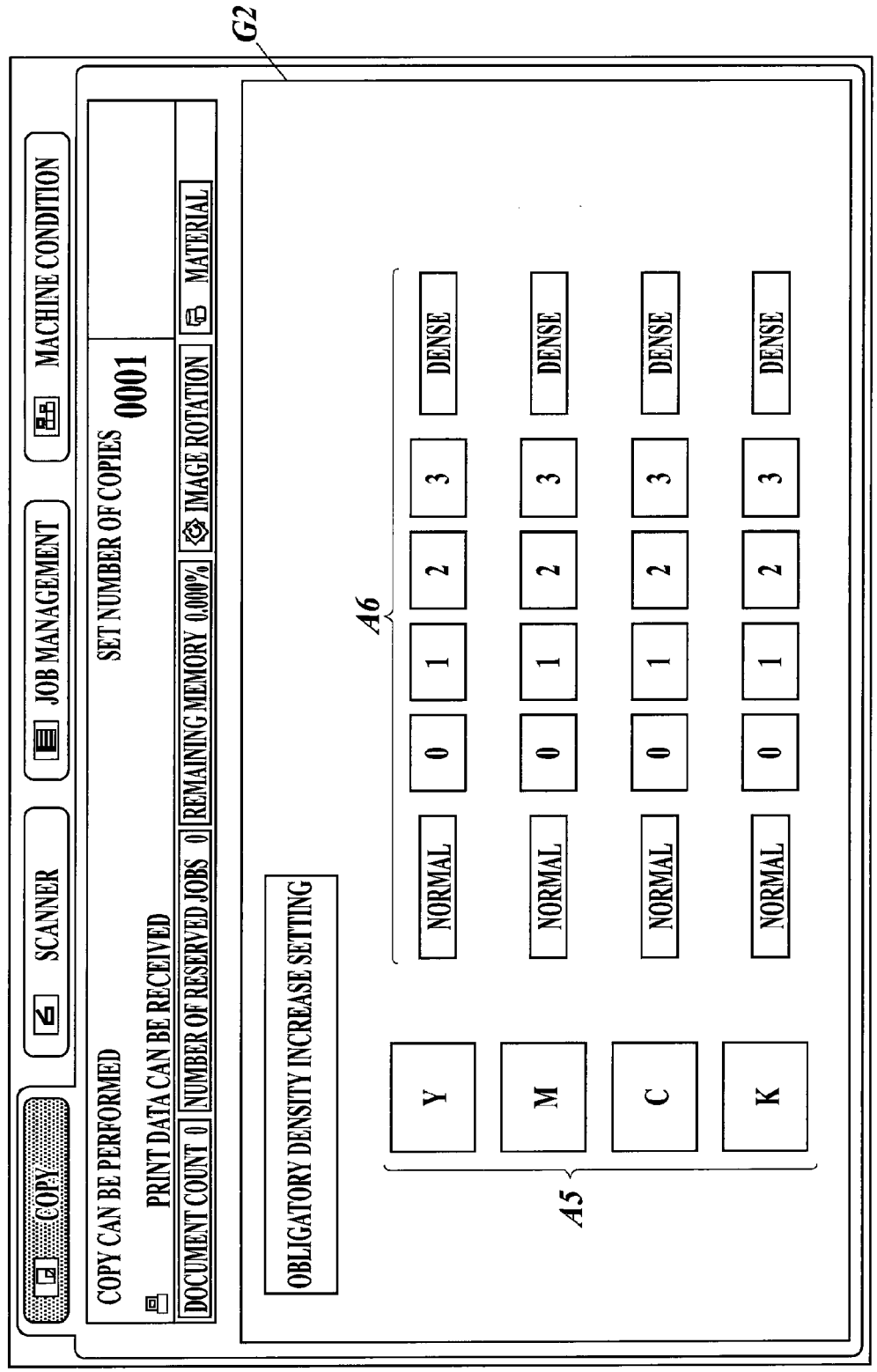

IMAGE FORMING APPARATUS WITH TONER DEPOSIT CONTROL AND PAPER INTERVAL CONTROL

BACKGROUND OF THE INVENTION

1. Field of the Invention

The present invention relates to an image forming apparatus.

2. Description of Related Art

Conventionally, in image forming apparatuses, it is known that even when toner weight (toner deposit) per unit area on a paper is same, density of an image which is the final output differs according to different types of papers. For example, image density becomes denser in coated papers, however, image density becomes lighter in coarse-woven papers. This is due to an influence of permeation degree of toner to a paper during fixing process.

Therefore, when an image is formed on a coarse-woven paper by using an apparatus in which the print density standard is set based on papers which are prone to increase image density such as coated papers, there is a problem that the image density becomes light.

In view of the above problem, there is suggested an technique for avoiding such problem by changing the toner deposit when such decrease in density exceeds the limit that can be solved by the density adjustment function provided in a regular image forming apparatus.

In particular, for example, JP 2009-139561 discloses a technique which focuses on the fact that the density of toner image on a coated paper is denser when same amount of toner is used for a regular paper and a coated paper when looking at the relation between toner weight and density when forming an image on a regular paper and a coated paper, and matches the density of toner images in the papers by decreasing the toner amount when coated papers are being used.

Further, JP 2004-184509 discloses a technique for easily changing (setting) the image forming condition based on a desired image density and for forming an image in the density of user's preference even when the paper types are different.

Among image forming apparatuses, an image forming apparatus which is provided with a sensor near the intermediate transfer belt in the image forming apparatus, which generates a patch image for controlling the toner amount to be deposited on a paper at a position corresponding to a position between toner images of images to be formed consecutively and performs image quality stabilizing correction processing to stabilize the image quality by reading the patch image by the sensor and feeding back the read patch image to the image parameter is known. By performing the above processing, varying of images can be inhibited while maintaining productivity of image forming.

However, in the techniques described in JP 2009-139561 and JP 2004-184509, when the image quality stabilizing correction processing is performed in a state where the toner deposit is increased in order to ensure image density, a patch image to which greater amount of toner than usual is attached is to be generated on the photosensitive drum and the intermediate transfer belt in the image forming apparatus. Therefore, such patch image is excluded from the sensitivity range of the sensor which reads densities of patch images and an appropriate correction will not be performed.

If the increased toner deposit is made to return to the usual amount at the time of generation of patch image, for example, such problem can be avoided. However, the conveyance interval between consecutive papers is set by considering productivity, and there is not enough time to control so as to return the increased toner deposit to the usual amount and generate a patch image and then increase the toner deposit again during an interval between regular papers.

Therefore, when toner deposit is increased in order to ensure image density, the image quality stabilizing correction processing cannot be performed properly in such state, and as a result, there is a problem that stability in image quality cannot be ensured.

SUMMARY OF THE INVENTION

In view of the above problems, an main object of the present invention is to provide an image forming apparatus which can ensure stability in image quality even when image density is increased.

In order to realize the above object, an image forming apparatus reflecting one aspect of the present invention includes an image forming unit which performs image forming on a paper, an image carrier on which a toner image is formed by the image forming unit, a patch image generation unit which generates a patch image for image density detection so as to be disposed between toner images of images formed consecutively on the image carrier, a patch density sensor which detects a density of the patch image generated by the patch image generation unit, a correction unit which performs correction processing to match a detected density and an aimed density by comparing the detected density of the patch image detected by the patch density sensor and the aimed density of the patch image which is set in advance, a toner deposit control unit which controls a toner deposit when the image forming unit performs image forming and a paper interval control unit which control an interval between consecutive papers, and in a case where the patch image generation unit generates the patch image when the toner deposit is changed to be greater than a predetermined standard value, the paper interval control unit executes a paper interval broadening processing to make the interval between consecutively conveyed papers be longer than a standard interval, the image forming unit makes an interval between the toner images of images formed consecutively on the image carrier be longer than a standard interval, and the toner deposit control unit executes a toner deposit changing processing to return the toner deposit to a predetermined standard value.

Preferably, the image forming apparatus further includes a setting unit which sets the correction processing to be prohibited when the toner deposit is greater than a predetermined standard value and an informing unit which informs that the patch image is not to be generated when the setting unit sets the correction processing be prohibited, and when the setting unit sets the correction processing be prohibited, the paper interval control unit does not execute the paper interval broadening processing and the toner deposit control unit does not executed the toner deposit changing processing.

Preferably, the image forming unit periodically stops the image forming when the setting unit sets the correction processing be prohibited, and the patch image generation unit generates the patch image during a periodic stop period of the image forming.

Preferably, the toner deposit control unit changes the toner deposit for each color.

Preferably, only when the patch image generation unit generates the patch image in a color same as a color in which the toner deposit is set to be greater than a predetermined standard value, the paper interval control unit executes the paper interval broadening processing and the toner deposit control unit executes the toner deposit changing processing.

Preferably, when the toner deposit is changed only with respect to a black toner by the toner deposit control unit, the patch image generation unit prohibits generation of a black patch image, and when the toner deposit is changed with respect to at least one color of toner other than black by the toner deposit control unit, the patch image generation unit prohibits generation of patch images of all colors.

Preferably, when the patch image generation unit stops generation of the patch image of at least one of black or all colors other than black, the image forming unit periodically stops the image forming, and the patch image generation unit generates the black patch image or the patch images of all colors other than black during a periodic stop period of the image forming.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is an example showing a paper profile selection screen;

FIG. 7 is an example showing a toner deposit setting screen;

DESCRIPTION OF THE PREFERRED EMBODIMENTS

Figure 1:
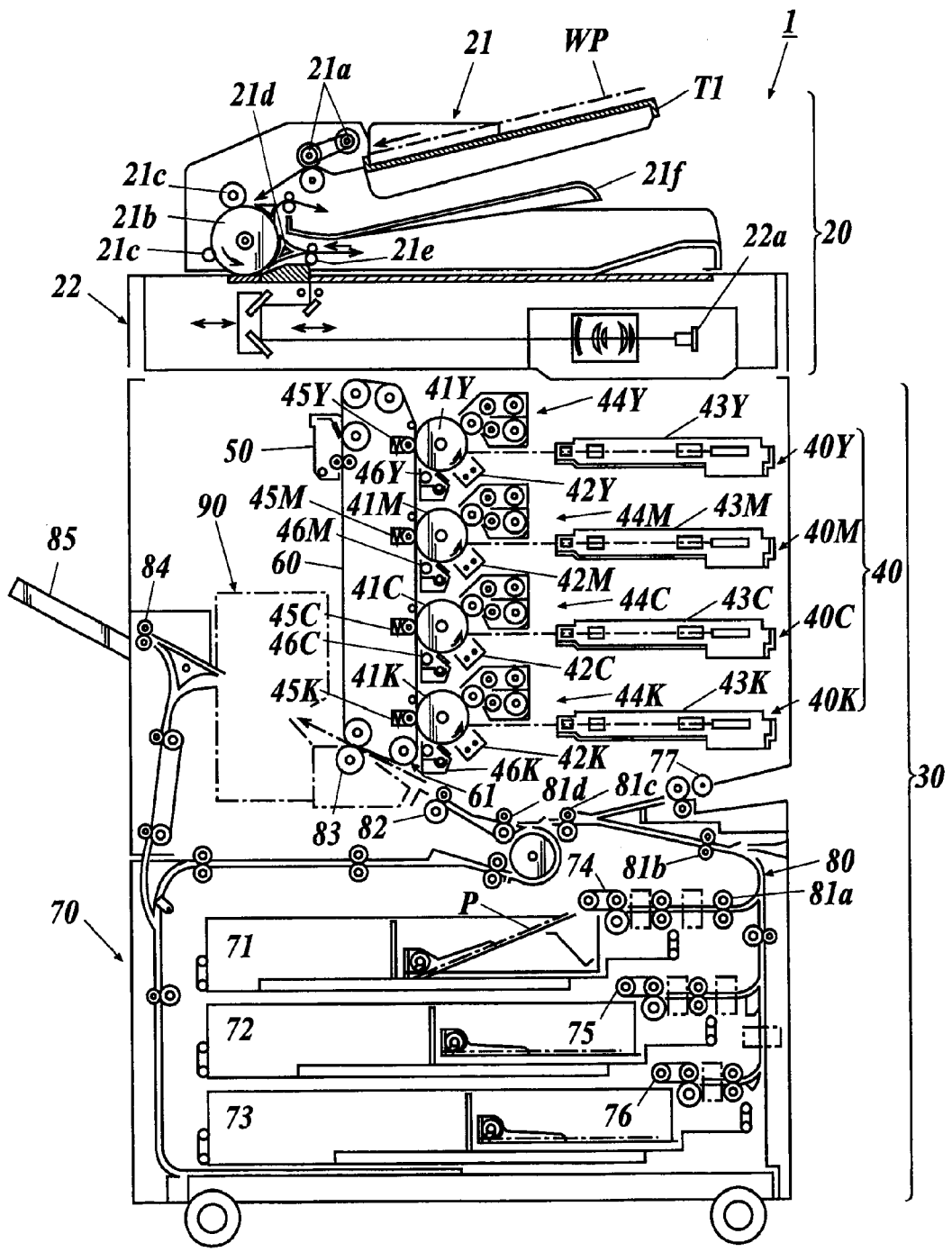
FIG. 1 is an outline of cross-sectional configuration view of an image forming apparatus according to the first embodiment.

Hereinafter, embodiments of the present invention will be described with reference to drawings. However, the scope of the present invention is not limited to the examples shown in the drawings in any way.

[First Embodiment]

First, a configuration will be described.

As shown in FIG. 1, the image forming apparatus 1 is a digital multi function printer including a copy function in which an image is read from a document WP subject to reading (hereinafter, called "document") and the read image is formed on papers P such as flat papers as papers subject to processing, a printer function in which image data is received from a personal computer or the like and an image is formed and output on papers P based on the received image data, and so forth. As shown in FIG. 1, the image forming apparatus 1 includes an image reading unit 20, a print unit 30 and so forth.

The image reading unit 20 includes an auto document feeder 21 and a reader 22.

The auto document feeder 21 is called ADF, and the auto document feeder 21 conveys documents WP loaded in the document tray T1 to the reading part of the reader 22 one by one.

The auto document feeder 21 includes a paper feeding roller 21a which conveys the documents WP mounted on the document tray T1 in order from the top, a contact roller 21b for passing the documents WP while making the documents WP be in close contact with the contact glass which is the reading part of the documents WP and a guiding roller 21c for guiding the documents WP which are conveyed by the paper feeding roller 21a along the contact roller 21b. The auto document feeder 21 further includes a switching nail 21d for switching conveyance direction of the documents WP which passed the contact glass, a reverse roller 21e for reversing front and back of the documents WP and a paper ejection tray 21f to which the documents WP in which reading thereof is finished are output.

The reader 22 includes a scanner provided with a light source, a lens, a contact glass, an image sensor 22a and the like. The reader 22 reads an image of the documents WP by imaging the reflection of the light emitted to the documents and performing opto-electric conversion and outputs the read image to the print unit 30. Here, image includes text data such as letters, symbols and the like, and not limited to image data such as graphics, photographs and the like.

The print unit 30 includes an image forming unit 40, a cleaning unit 50, an intermediate transfer belt 60, a paper feeding unit 70, a conveyance unit 80 and a fixing unit 90.

When forming an image with maximum of four colors (yellow (Y), magenta (M), cyan (C) and black (K)), the image forming unit 40 of this embodiment is configured by including image forming units 40Y, 40M, 40C and 40K for each color so that each of the image forming units can be filled with each of different colors.

For example, the image forming unit 40Y, as an image forming unit, includes a charging device 42Y, an exposure device 43Y, a development device 44Y, a primary transfer roller 45Y and a cleaning device 46Y which are disposed around the photosensitive drum 41Y, and forms a yellow (Y) image.

In particular, charging is carried out by the charging device 42Y so that the surface of the photosensitive drum 41Y be uniformly charged. By emitting light according to the yellow (Y) image data from the exposure device 43Y to the photosensitive drum 41Y which is charged by the charging device 42Y, an electrostatic latent image is formed.

Then, the developing device 44Y develops the electrostatic latent image by attaching charged yellow (Y) toner on the surface of the photosensitive drum 41Y on which the electrostatic latent image is formed. This development is carried out by the reversal development where developing bias in which AC voltage is superimposed on DC voltage having the same polarity as the polarity of the toner to be used is applied.

The electrostatic latent image on the photosensitive drum 41Y to which toner is attached by the development device 44Y is to be transferred to the after-mentioned intermediate transfer belt 60 by the photosensitive drum 41Y being rotated at a constant speed to the transferring position where the primary transfer roller 45Y is disposed. After the toner is transferred to the intermediate transfer belt 60, the cleaning device 46Y removes residual charge, residual toner and so forth on the surface of the photosensitive drum 41Y.

Further, inside of the developing device 44Y is filled with two-component developer which is a mixture of carrier which is a magnetic material and toner which is a non-magnetic material.

Here, toner amount to be deposited on the surface of the photosensitive drum 41Y is determined in advance so that the image which is to be formed by the image forming unit 40Y have the density which is set in advance. However, in this embodiment, the toner amount can be changed (increased) in multiple degrees according to user's operation.

That is, when a setting to increase toner deposit is input, the toner deposit at the photosensitive drum 41Y and the intermediate transfer belt 60 is increased to be greater than a predetermined standard value which is set in advance and the image to be formed on a paper becomes denser.

Similarly, the image forming units 40M, 40C and 40K, as image forming units, include respectively charging devices 42M, 42C and 42K, exposure devices 43M, 43C and 43K, developing devices 44M, 44C and 44K, primary transfer rollers 45M, 45C and 45K and cleaning devices 46M, 46C and 46K which are disposed surrounding the photosensitive drums 41M, 41C and 41K, respectively, and the image forming units 40M, 40C and 40K form magenta (M) images, cyan (C) images and black (K) images, respectively.

The intermediate transfer belt 60 as an image carrier is a semiconductor endless belt which is supported so as to rotate by being bridged across a plurality of rollers, and the rotation of the intermediate transfer belt 60 is driven with rotation of the rollers.

The intermediate transfer belt 60 is pressed against the photosensitive drums 41Y, 41M, 41C and 41K by the primary transfer rollers 45Y, 45M, 45C and 45K, respectively. Thereby, toners developed on the surfaces of the photosensitive drums 41Y, 41M, 41C and 41K are transferred on to the intermediate transfer belt 60 at the positions where transferring is to be performed by the primary transfer rollers 45Y, 45M, 45C and 45K, respectively, and toners of yellow, magenta, cyan and black are sequentially superimposed on each other and transferred on to the paper P at the position where transferring is to be performed by the secondary transfer roller 83.

Moreover, the image forming unit 40 (40M, 40C, 40K) generates a patch image for image density detection so that the patch image is disposed between toner images for images which are to be formed consecutively.

Patch image is a toner image to be generated between one toner image and the next toner image on the intermediate transfer belt 60, the toner images are to be transferred on to the papers (that is, a patch image is to be generated so as to be disposed in between papers), and patch image is a predetermined pattern image including a solid image portion and the like used for color adjustment and the like.

A patch density sensor 61 is provided at lower side in rotation direction of the intermediate belt 60 than all of the primary transferring positions and upper side in rotation direction of the intermediate belt 60 than the secondary transferring position. The patch density sensor 61 is a sensor for detecting density (hereinafter, called patch density) of a patch image formed on the intermediate transfer belt 60 by the image forming unit 40. As the patch density sensor 61, for example, a photo sensor, including a light emitting unit and a light receiving unit, for measuring patch density by the light receiving unit detecting the reflection of the light which is emitted from the light emitting unit and reflected by the patch image can be used.

Processing of the charging device, the exposure device and the like of each image forming unit is to be adjusted by forming a patch image for each image forming unit 40, detecting the density of the formed patch image by using the patch density sensor 61 and comparing the density (detected density) of the patch image which is detected and the density (aimed density) of the patch image which is preset, once every given time period such as at the timing when the image forming apparatus 1 outputs the number of prints which is set in advance, when a preset time period elapsed and the like.

Here, the aimed patch density is set in advance.

The paper feeding unit 70 includes a plurality of paper feeding trays 71, 72 and 73. Standard size papers P which are identified in advance by sizes and paper types according to paper feeding trays are housed in the paper feeding trays 71, 72 and 73. Further, the papers P housed in the paper feeding trays 71, 72 and 73 are conveyed one by one from the top to the conveyance unit 80 by the paper feeding rollers 74, 75 and 76, respectively. Each paper feeding tray has different identification number such as "No. 1", "No. 2", "No. 3" and the like to be acknowledged by the control unit 110.

The conveyance unit 80 conveys the papers P which are conveyed from the paper feeding trays 71, 72 and 73 to the secondary transfer roller 83 via a plurality of intermediate rollers 81a, 81b, 81c and 81d and the resist roller 82. By the secondary transfer roller 83, the toner image which is transferred on to the intermediate transfer belt 60 is transferred on to the paper P in a lump.

Then, the toner image which is transferred on the paper P is fixed by heat in the fixing unit 90. The paper P to which the fixing processing is performed is output onto the paper ejection tray 85 by being sandwiched by the paper ejecting rollers 84.

On the other hand, after transferring the toner image on to the paper P, residual toner is removed from the intermediate transfer belt 60 by the cleaning unit 50.

Figure 2:
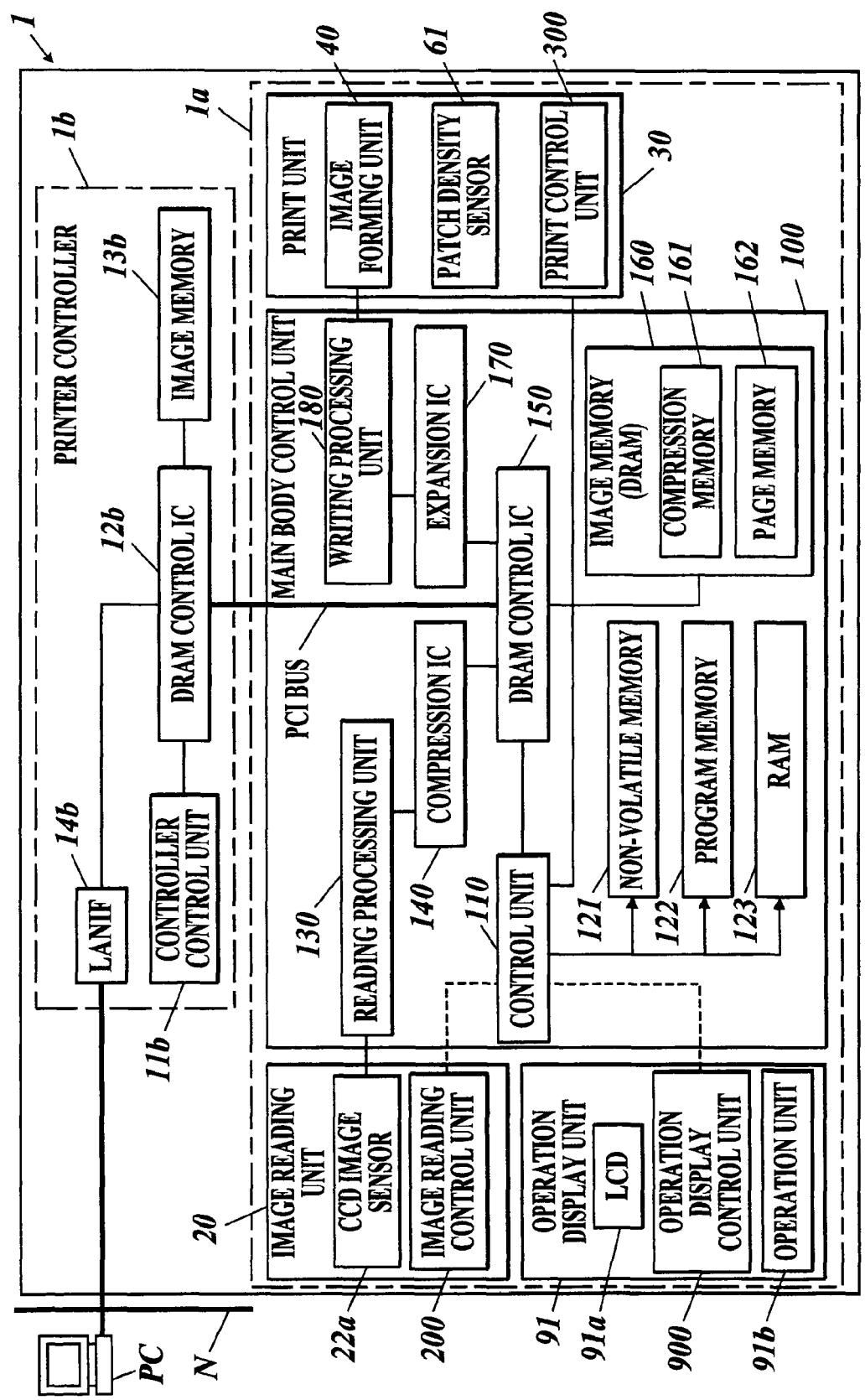
FIG. 2 is a block diagram showing a control structure of the image forming apparatus of FIG. 1.

FIG. 2 shows a control block diagram of the image forming apparatus 1.

As shown in FIG. 2, the image forming apparatus 1 includes a main body 1a and a printer controller 1b. The image forming apparatus 1 is connected with an external device PC on a network N so as to communicate with each other via LANIF (Local AreaNetwork InterFace) 14b of the printer controller 1b.

The main body 1a includes an image reading unit 20, the print unit 30, an operation display unit 91 and a main body control unit 100. Here, same symbols are used for the configurations which are same as the parts described in FIG. 1, and the descriptions are omitted.

The main body control unit 100 includes a control unit 110, a non-volatile memory 121, a program memory 122, a RAM (Random Access Memory) 123, a reading processing unit 130, a compression IC 140, a DRAM (Dynamic Random Access Memory) control IC 150, an image memory 160, an expansion IC 170, a writing processing unit 180 and so forth.

The control unit 110 is constituted of CPU (Central Processing Unit), a ROM (Read Only Memory), a RAM (Random Access Memory) and so forth, and the control unit 110 integrally controls the operation of each part in the image forming apparatus 1 according to various types of processing programs and data stored in the program memory 122.

For example, the control unit 110 switches between copy mode, print mode and scanner mode according to instruction signals input from the operation display unit 91 and the external device PC, and performs controlling of copy, print, reading of image data and the like by reading out the processing program of each mode.

Further, the control unit 110 performs processing for setting paper profiles such as rewriting (overwrite) a predetermined item in a predetermined paper profile stored in the non-volatile memory 121 and the like according to instruction signals input from the operation display unit 91.

Moreover, the control unit 110, as a toner deposit control unit, controls the print control unit 300 to control toner deposit at the time of image forming by the image forming units 40Y, 40M, 40C and 40K. At this time, when toner deposit is set to be changed for each color of toner, the control unit 110 can change the toner deposit for each color of toner.

Further, the control unit 110, as a paper interval control unit, performs controlling so that papers maintain a predetermined interval therebetween while they are conveyed.

When the image forming unit 40 generates a patch image in a state where toner deposit is changed to be greater than a predetermined standard value, the control unit 110 executes the paper interval broadening processing to make the interval between papers which are conveyed consecutively be longer than the standard interval and makes the interval between toner images of images to be formed consecutively on the intermediate transfer belt 60 be longer than the standard interval. Further, the control unit 110 executes the toner deposit changing processing to return the toner deposit to the predetermined standard value.

In particular, the control unit 110 executes the paper interval broadening processing and the toner deposit changing processing only when the patch image in same color as the color in which the toner deposit is set to be greater than the predetermined standard value is to be generated. Thereby, the interval between the papers is broadened to an extent that the toner deposit of the increased toner can be returned to the original value (the predetermined standard value), a patch image having a normal width can be generated and the toner deposit can be increased again.

Data according to image forming, data processed by various types of programs and so forth are stored in the non-volatile memory 121.

For example, the paper profile table 121a, the paper feeding tray setting table 121b and the like are stored in the non-volatile memory 121.

Figures 3, 4:
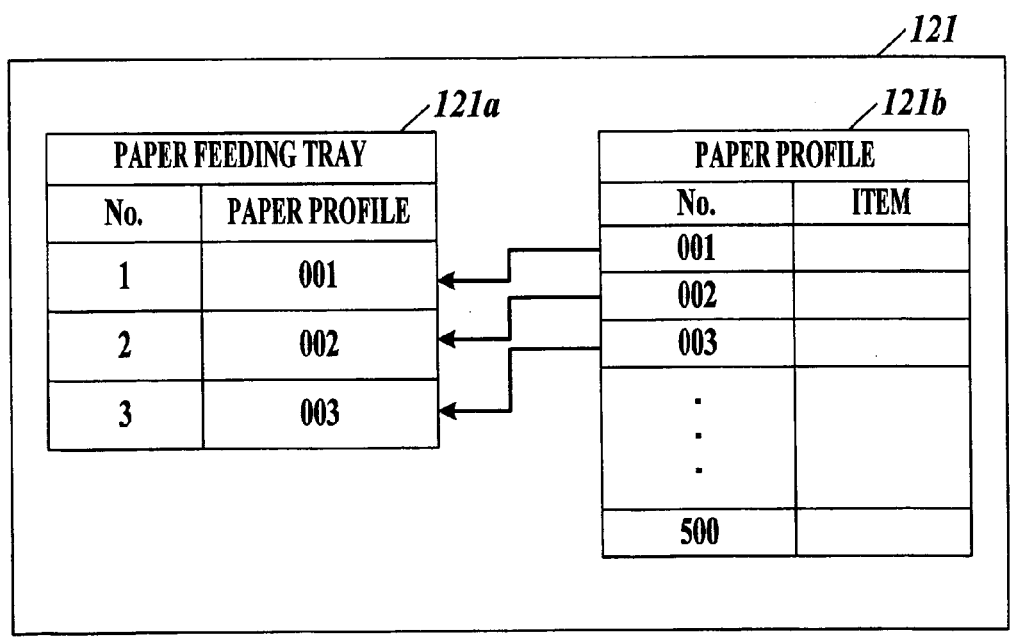
FIG. 3 is an example showing a configuration of paper profile.
FIG. 4 is a diagram for explaining a relation between paper feeding trays and the paper profile.

Here, paper profile is setting information regarding papers to be used in the image forming apparatus 1, and image forming condition with respect to paper is included in the setting information. In particular, settings of various types of items such as "paper type", "paper name", "basis weight unit", "basis weight", . . . , "toner deposit" are registered in each paper profile as shown in FIG. 3.

Further, different identification number such as "001", "002", for example, is attached to each paper profile to be recognized by the control unit 110.

Here, "toner deposit" is the item for deciding toner deposit for image forming by the image forming unit 40. Further, although it is omitted in the drawings, each color of toner has its "toner deposit" item in the paper profile and toner deposit can be set for each color of toner.

The paper profile table 121a has a region where five hundred paper profiles can be stored, for example.

Then, each of the paper feeding trays 71, 72 and 73 is associated with one paper profile, and image forming is to be carried out to the papers housed in each of the paper trays based on the image forming condition registered in the associated paper profile.

FIG. 4 shows an example where the paper profile "001" is set for the paper feeding tray "No. 1" (paper feeding tray 71), the paper profile "002" is set for the paper feeding tray "No. 2" (paper feeding tray 72) and the paper profile "003" is set for the paper feeding tray "No. 3" (paper feeding tray 73).

In this embodiment, a user can rewrite the setting of a given item in a given paper profile stored in the paper profile table 121a in the non-volatile memory 121.

In particular, when a user selects any of paper profiles stored in the paper profile table 121a in the non-volatile memory 121 by the after-mentioned paper profile selection screen G1 and performs setting so as to increase toner deposit by the after-mentioned toner deposit setting screen G2, the toner deposit in the selected paper profile is written.

Therefore, by rewriting the toner deposit in the paper profile which is associated with a predetermined paper feeding tray, the toner deposit can be increased for image forming. That is, a dense image can be formed.

Various types of programs according to image forming and so forth are stored in the program memory 122.

Here, in the example, the non-volatile memory 121 and the program memory 122 are provided separately. However, single non-volatile memory which stores various types of programs and data may be used.

The RAM 123 forms a work area to temporarily store various types of programs to be executed by the control unit 110 and data according to the programs.

The reading processing unit 130 performs various processing such as analog processing, A/D conversion processing, shading processing and the like to analog image signals input from the image reading unit 20 and thereafter, generates digital image data. The generated image data is output to the compression IC 140.

The compression IC 140 performs compression processing to the input digital image data and outputs the digital image data to which the compression processing is performed to the DRAM control IC 150.

The DRAM control IC 150 controls the compression processing of digital image data performed by the compression IC 140 and the expansion processing of compressed image data performed by the expansion IC 170 and controls input and output of image data to and from the image memory 160 according to the instruction from the control unit 110. For example, when storing of analog image signal which is read by the image reading unit 20 is instructed, the DRAM control IC 150 makes the compression IC 140 execute the compression processing of the digital image data which is input from the reading processing unit 130 and stores the compressed image data in the compression memory 161 of the image memory 160. Further, when print output of the compressed image data stored in the compression memory 161 is instructed, the DRAM control IC 150 reads out the compressed image data from the compression memory 161 and makes the expansion IC 170 perform the expansion processing and stored the expanded image data in the page memory 162. Furthermore, when print output of the image data stored in the page memory 162 is instructed, the DRAM control IC 150 reads out the image data from the page memory 162 and outputs the image data to the writing processing unit 180.

The image memory 160 is constituted of a DRAM (Dynamic RAM) and includes the compression memory 161 and a page memory 162. The compression memory 161 is a memory for storing compressed image data, and the page memory 162 is a memory for temporarily storing image data which is subject to print output before the print output.

The expansion IC 170 performs the expansion processing to the compressed image data which is to be input.

The writing processing unit 180 generates print data for image forming and outputs the generated print data to the print unit 30 based on the image data which is input from the DRAM control IC 150.

The image reading unit 20 includes an image sensor 22a, an image reading control unit 200, and components of such as the auto document feeder 21 and the reader 22 shown in FIG. 1 although they are not illustrated here. The image reading control unit 200 controls the auto document feeder 21 and the reader 22 and so forth to execute the light exposure scanning of the document placed on the platen glass and reads an image by making the image sensor 22a perform opto-electric conversion of the reflection light. The analog image signal which is read is output to the reading processing unit 130 of the main body control unit 100.

The print unit 30 is constituted of each component of the image forming unit 40 (image forming unit 40Y, 40M, 40C, 40K), various types of sensors such as the patch density sensor 61 and print output shown in FIG. 1 and the print control unit 300 and the like.

The print control unit 300 includes a CPU, a ROM, a RAM, a non-volatile memory and so forth, and the print control unit 300 controls the operation of each part in the print unit 30 such as the image forming units 40Y, 40M, 40C and 40K according to instructions from the control unit 110 to perform image forming on the papers P based on the print data which is input from the writing processing unit 180.

In particular, the print control unit 300 controls the operations so that the image forming units 40Y, 40M, 40C and 40K perform image forming on papers based on the paper profile which is set for each of the paper feeding trays 71, 72 and 73 according to instructions from the control unit 110.

That is, the print control unit 300 performs image forming based on the image forming condition which is set in the paper profile.

At this time, the print control unit 300 refers to the toner deposit in the paper profile and performs the toner deposit increasing processing in which image forming is performed by increasing the toner deposit of the target toner when the toner deposit is set to be greater than a predetermined standard value which is set in advance by the control of the control unit 110.

Moreover, the print control unit 300 adjusts the processing of each of the image forming units 40Y, 40M, 40C and 40K based on the patch density (detected density) which is detected by the patch density sensor 61 and the patch density (aimed density) which is set in advance for each of the image forming units 40Y, 40M, 40C and 40K by the control of the control unit 110.

In particular, the print control unit 300, as a correction unit, compares the detected density which is detected by the patch density sensor 61 and the aimed density which is set for each of the image forming units 40Y, 40M, 40C and 40K in advance and performs the image quality stabilizing correction processing (correction processing) for stabilizing the image quality by feeding back the comparison result to the image parameter so that the detection density and the aimed density match.

At this time, when the patch image is generated in a state where change in toner deposit is set to any of (or all of) the image forming units 40Y, 40M, 40C and 40K, the toner density on the photosensitive drum and the intermediate transfer belt may be too dense, exceeding the sensitivity region of the patch density sensor 61, and there is a problem that an appropriate correction processing cannot be performed.

In view of the above problem, in this embodiment, in the case where the patch image is generated when the toner deposit is changed to be greater than the predetermined standard value, the print control unit 300 performs the toner deposit changing processing to return the setting of toner deposit to the predetermined standard value (that is, return the high pressure output such as the potential of the photosensitive drum and the developing bias voltage to their original) by the control of the control unit 110, in order to perform an appropriate correction processing.

Figure 5A:
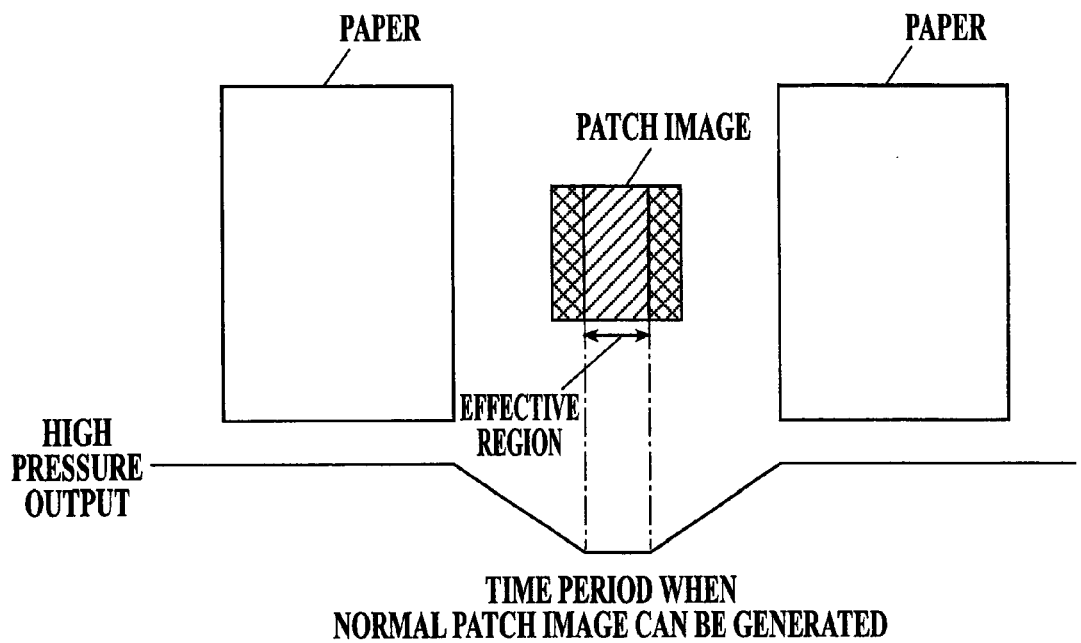
FIG. 5A is a diagram for explaining paper interval broadening processing and patch image generation processing.

However, certain period of time is needed to return the high pressure output such as the potential of the photosensitive drum and the developing bias voltage. Therefore, as shown in FIG. 5A, the time period where the patch image of normal density can be generated is to be short when the patch image generation is carried out during the normal interval between papers. Thus, the effective region of the patch image which can be used for an appropriate correction processing is to be small.

Figure 5B:
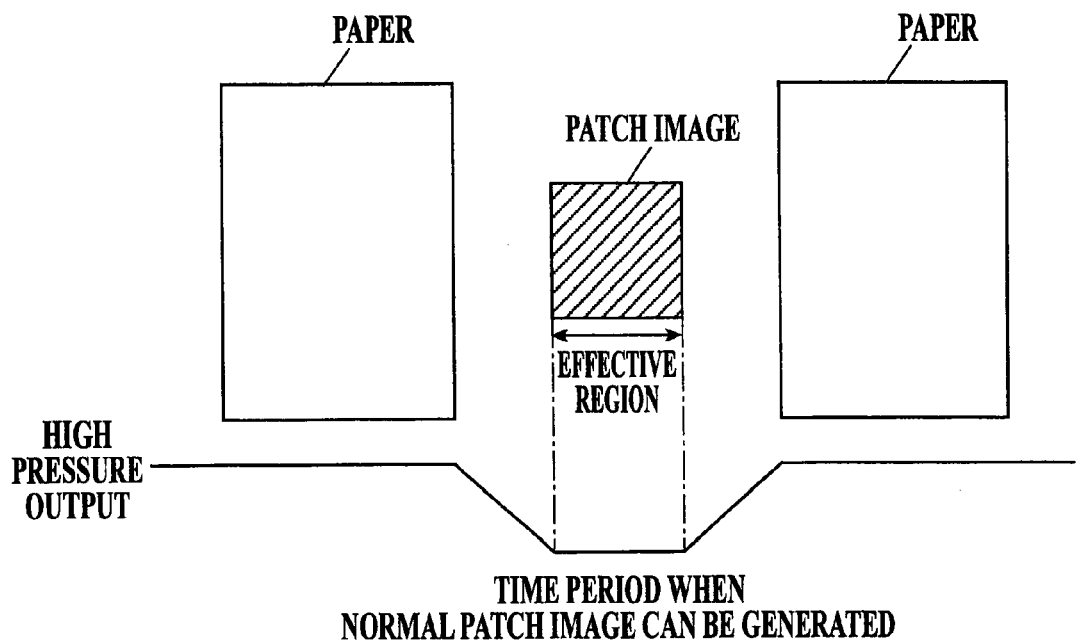
FIG. 5B is a diagram for explaining paper interval broadening processing and patch image generation processing.

For this reason, the control unit 110 makes the interval between papers be longer as shown in FIG. 5B when the patch image in the same color as the color of the toner of which the toner deposit is set to be greater than a predetermined standard value is to be generated by executing the paper interval broadening processing. Therefore, because the interval between papers is made to be longer, the time period for generating the patch image of normal density can be assured and the effective region of the patch image can be sufficiently assured.

The operation display unit 91 is constituted of a LCD (Liquid Crystal Display) 91a, a touch panel provided so as to cover the LCD 91a, an operation unit 91b including a group of operation keys and an operation display control unit 900.

The LCD 91a displays various types of setting screens, various types of processing results and the like for inputting various types of setting conditions according to the display signals input from the control unit 110.

The operation unit 91b is used when a user inputs the setting with respect to various types of setting screens displayed in the LCD 91a. In particular, the operation unit 91b is used when a user inputs settings regarding toner deposit.

The operation display control unit 900 displays various types of setting screens and the like in the LCD 91a according to the instructions signals input from the control unit 110 and outputs the operations signals input from the operation unit 91b to the control unit 110.

Here, FIGS. 6 and 7 show examples of setting screens to be displayed in the LCD 91a.

FIG. 6 is an example of a paper profile selection screen G1.

The paper profile selection screen G1 is displayed by a user operating the "calling of setting" in the processing selection screen (omitted from the drawing).

A paper profile stored in the non-volatile memory 121 is displayed in the selection screen G1 of paper profile. FIG. 6 shows an example where three paper profiles D1 to D3 which are registered are displayed in the selection screen G1 of paper profile.

In the selection screen G1 of paper profile, items such as "paper size", "paper type", "basis weight" and so forth are displayed for each of the paper profiles D1 to D3. However, by selecting any one of the paper profiles D1 to D3 and operating the content confirmation button A1, the detail screen (omitted in the drawing) is to be displayed and the detailed content of the selected paper profile can be confirmed.

Further, by selection any one of paper profiles D1 to D3 and operating the OK button A2, the paper profile in which the toner deposit is set to increase is selected.

Moreover, by operating the cancel button A3, the operation of selecting a paper profile can be canceled (stopped).

In such way, for example, when a user performs a setting to increase toner deposit in order to increase the image density, the paper profile selection screen G1 is used to select the paper profile to which the above described setting is to be reflected among the paper profiles already stored in the non-volatile memory 121.

FIG. 7 is an example of a toner deposit setting screen G2.

The toner deposit setting screen G2 is used to set toner deposit in the paper profile selected in the paper profile selection screen G1 or the paper profile which is registered in the paper profile register screen G2.

In particular, toner weight (toner deposit) per area on a paper can be set for each of the colors YMCK in the toner deposit setting screen G2.

In the toner deposit setting screen G2, color selection buttons A5 to select any of YMCK and a density setting buttons A6 which can set the density in number of degrees are displayed.

A user can set the setting relating to toner deposit for each color of toner. That is, a user can select any of YMCK by the color selection buttons A5 and thereafter, can set a desired density for the selected color selected by the density setting buttons A6.

Here, toner deposit is to be increased by the potential of the photosensitive drum and the developing bias voltage of each color being changed according to the density setting.

Further, the setting of toner deposit carried out by the toner deposit setting screen G2 is to be reflected in the toner deposit of the paper profile which is selected by the above mentioned paper profile selection screen G1 or in the toner deposit of the paper profile which is registered by the above mentioned paper profile register screen G2.

At this time, one or a plurality of colors among YMCK can be preset as target colors in which the toner deposit thereof is to be increased. When the target color is set, the color selection buttons A5 for colors other than the target color cannot be selected in the toner deposit setting screen G2.

For example, when black (K) is set as the target color, setting relating to toner deposit can be carried out only with respect to black toner in the toner deposit setting screen G2.

In such way, in a case where toner deposit can be controlled so as to increase only with respect to black toner, the control will be easy comparing to the case where toner deposits of all of the colors are to be increased.

Moreover, for example, in a case where all of the colors (YMCK) are set as target colors, setting relating to toner deposits of all of the colors can be carried out in the toner deposit setting screen G2. In such case, different value of toner deposit can be set for each of the colors.

In such way, in a case where toner deposits are controlled so as to increase the toner of all of the colors, desire for color reproduction which differs from user to user can be handled more appropriately.

In this embodiment, settings relating to toner deposit can be carried out in the operation display unit 91.

Next, each part of the printer controller 1b will be described. When the image forming apparatus 1 is used as a network printer, the printer controller 1b manages and controls the print job which is input in the image forming apparatus 1 from an external device PC which is connected to the network N and has a function to receive data which is subject to printing from the external device PC and allocate the data as print job according to the operation condition of the image forming device 1.

The printer controller 1b is constituted of a controller control unit 11b, a DRAM control IC 12b, an image memory 13b and a LANIF 14b.

The controller control unit 11b integrally controls the operations of components of the printer controller 1b and realizes a function to deliver the data which is input from the external device PC to the main body 1a via the LANIF 14b as a job according to the operation condition of the image forming apparatus 1.

The DRAM control IC 12b controls storing of the data which is received by the LANIF 14b in the image memory 13b and reading of the data from the image memory 13b. Further, the DRAM control IC 12b is connected with the DRAM control IC 150 of the main body control unit 100 by a PCI (Peripheral Components Interconnect) bus, and reads out the data which is subject to printing from the image memory 13b and outputs the data to the DRAM control IC 150 according to instructions from the controller control unit 11b.

The image memory 13b is constituted of a DRAM, and the output data which is input is temporarily stored in the image memory 13b.

The LANIF 14b is a communication interface for connecting with a network N such as LAN of NIC (Network Interface Card), modem and the like, and the LANIF 14b receives data from the external device PC. The received data is output to the DRAM control IC 12b.

Next, an operation of this embodiment will be described.

Figure 8:
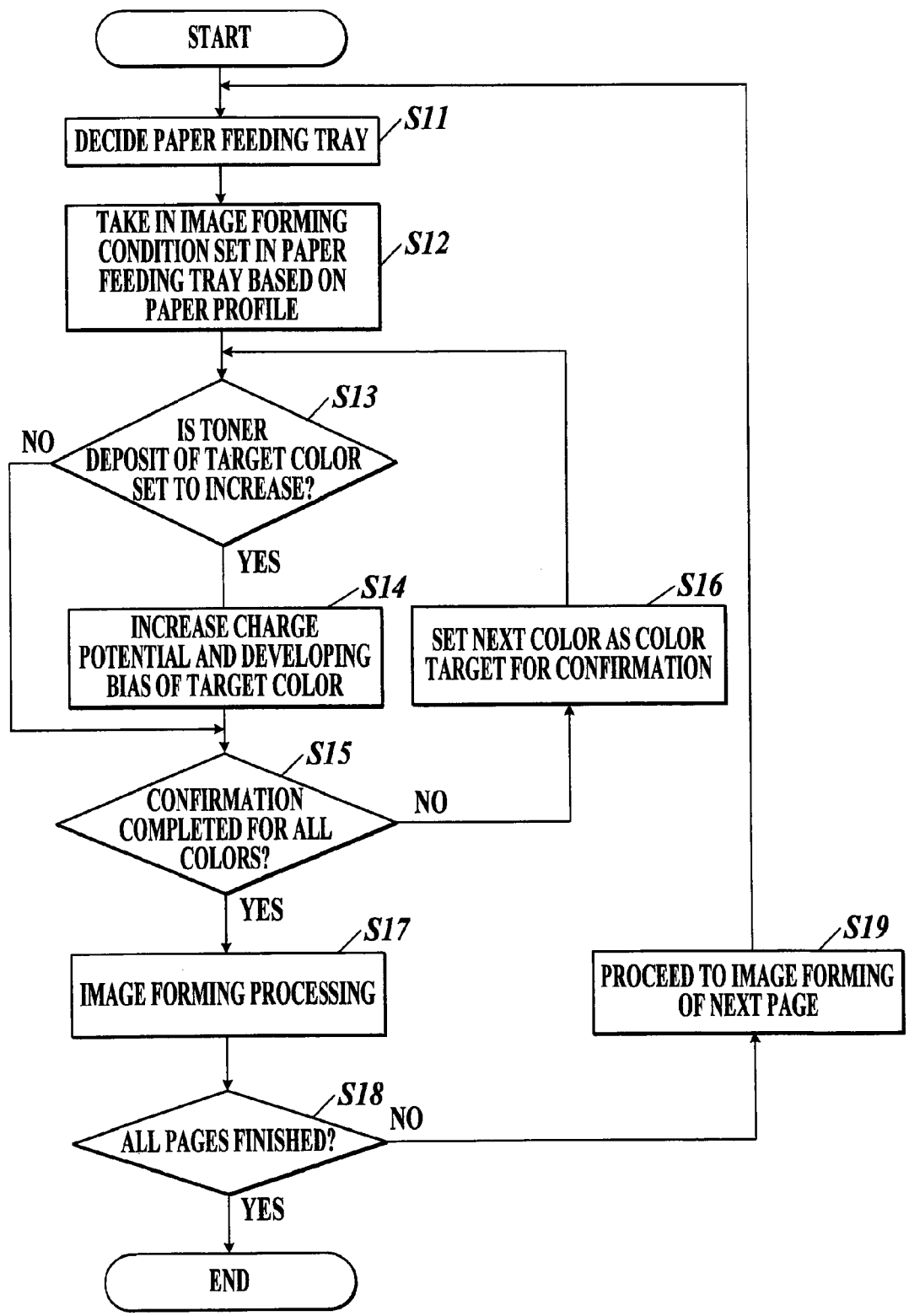
FIG. 8 is a flowchart showing toner deposit increasing processing.
Figure 9:
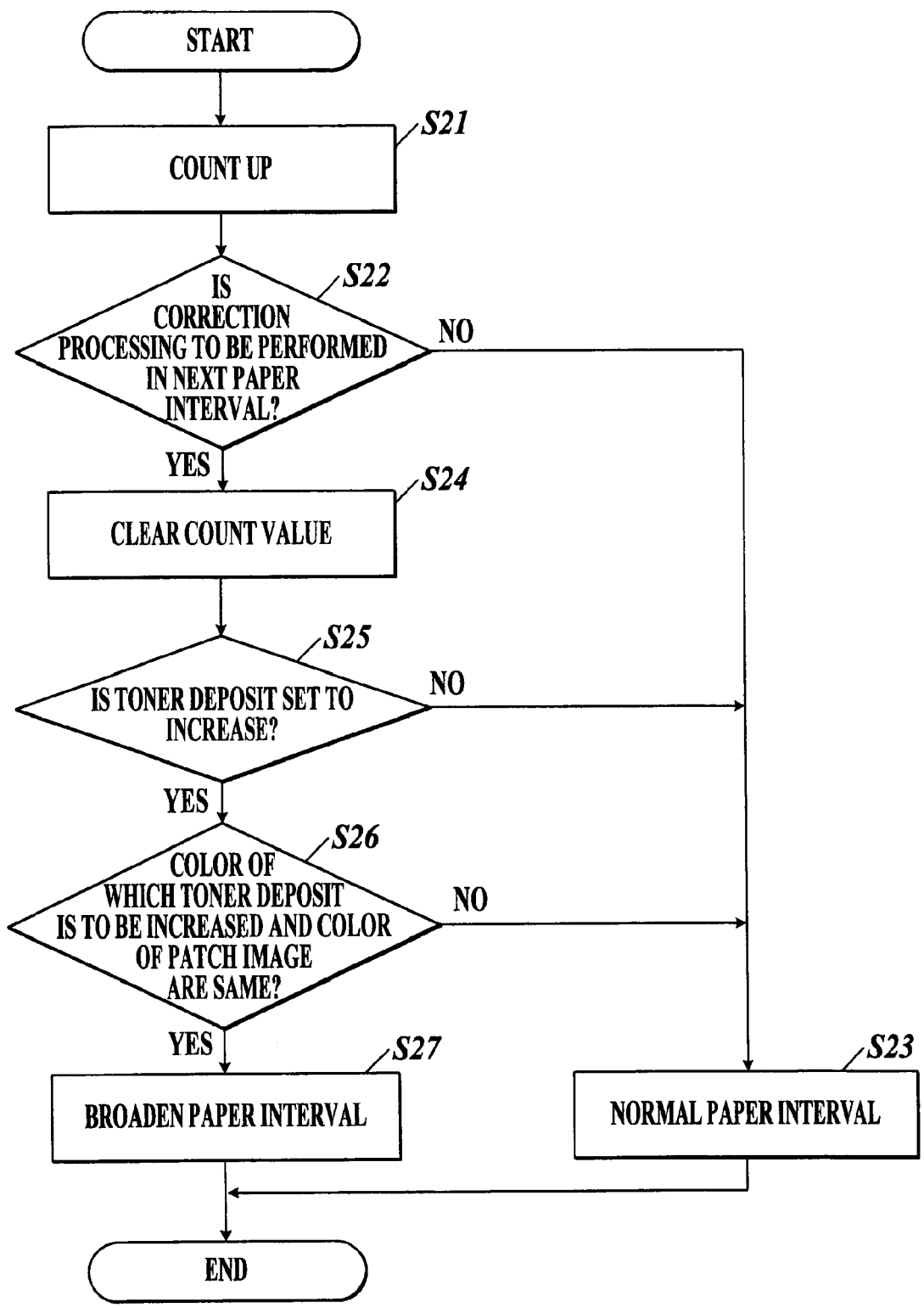
FIG. 9 is a flowchart showing paper interval broadening processing.

FIG. 8 shows a flowchart of the toner deposit increasing processing according to this embodiment, and FIG. 9 shows a flowchart of the paper interval broadening processing. Further, FIG. 10 shows a flowchart of the patch image generation processing.

Figure 10:
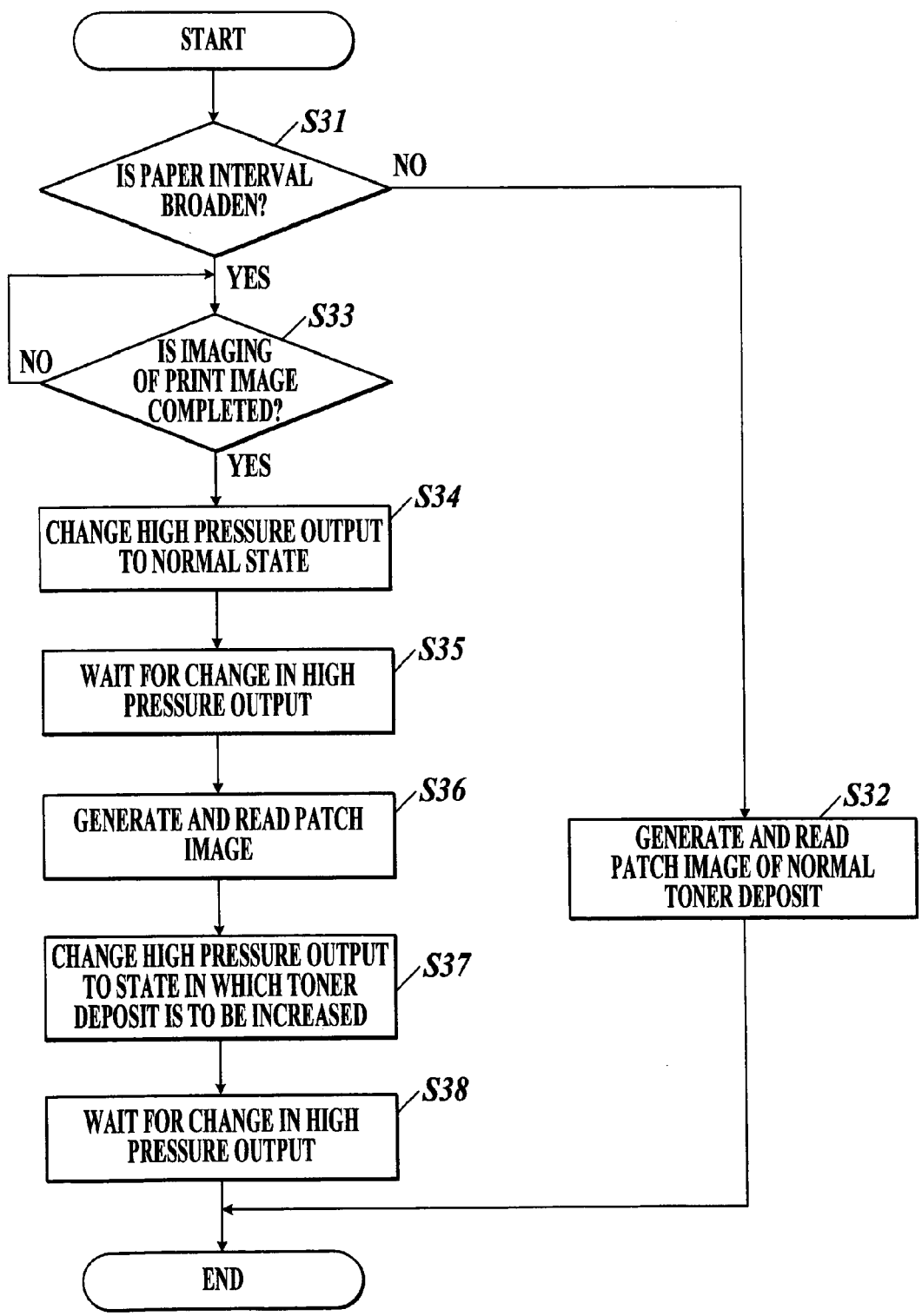
FIG. 10 is a flowchart showing patch image generation processing.

Here, the operations shown in FIGS. 8 to 10 are executed in the control unit 110.

First, the toner deposit increasing processing performed in the image forming apparatus 1 will be described by using FIG. 8.

In step S11, the control unit 110 decides the paper feeding tray which houses papers to be used for image forming according to user's designation.

Next, in step S12, the control unit 110 takes in image forming condition based on the paper profile set for the paper feeding tray decided in step S11.

Next, in step S13, the control unit 10 determines whether the toner deposit of the target color is set or not. In particular, the control unit 110 refers to the toner deposit of the target color in the image forming condition which is taken in in step S12 and determines whether the toner deposit of target color is set so as to be increased according to whether a value greater than a predetermined standard value is set for the toner deposit of the target color in the image forming condition.

Here, target color is one or a plurality of colors which is set in advance as a color in which toner deposit is to be increased. For example, when "K" is set as a target color, whether the toner deposit of "K" is set so as to be increased or not is determined. Further, when multiple colors are set as target colors, whether toner deposit is set so as to be increased or not is sequentially determined in an arbitrary order such as in order of "Y", "M", "C" and "K", for example.

Moreover, when the control unit 110 determines that toner deposit of the target color is not set so as to be increased in step S13 (step S13: NO), the control unit 110 proceeds to the after-mentioned step S15.

On the other hand, when the control unit 110 determines that toner deposit of the target color is set so as to be increased in step S13 (step S13: YES), the control unit 110 increases the charging voltage and increases developing bias of the target color to be applied in the image forming unit 40 in the subsequent step S14.

Next, in step S15, the control unit 10 determines whether confirmation of all of the colors which are target colors is completed. When the control unit 110 determines that confirmation of all of the colors is not completed (step S15: NO), the control unit 110 sets the next color as the color subject to confirmation in the subsequent step S16.

On the other hand, when the control unit 110 determines that confirmation of all of the colors is completed (step S15: YES), the control unit 110 executes the image forming processing in the subsequent step S17.

Next, the control unit 110 determines whether the image forming processing for all pages is finished in step S18. When the control unit 110 determines that image forming processing for all pages is finished (step S18: YES), the control unit 110 ends the processing.

On the other hand, when the control unit 110 determines that image forming processing for all pages is not finished (step S18: NO), the control unit 110 carries out a processing to move on to the image forming of the next page in the subsequent step S19, and then, returns to the above step S11 and repeats the processing thereafter.

Next, the paper interval broadening processing performed in the image forming apparatus 1 will be described by using FIG. 9.

First, in step S21, the control unit 110 performs counting up at a predetermined counting timing which is decided in advance based on paper size, print mode and the like.

Next, in step S22, by the control unit 110 determining whether the count value is greater than a predetermined value, whether the correction processing is to be carried out in the next paper interval (whether a patch image is to be generated or not) is determined.

When the control unit 110 determines that the correction processing is not to be carried out in the next paper interval (step S22: NO), the control unit 110 determines that the paper interval is to remain at a normal standard interval in the subsequent step S23 and ends the processing.

On the other hand, when the control unit 110 determines that the correction processing is to be carried out in the next paper interval (step S22: YES), the control unit 110 clears the count value in the subsequent step S24.

Next, in step S25, the control unit 110 determines whether toner deposit is set to be increased.

This determining is carried out based on the image forming condition (see step S12 of FIG. 8) which is taken in when image forming starts.

When the control unit 110 determines that toner deposit is not set to be increased (step S25: NO), the control unit 110 proceeds to the above mentioned step S23.

On the other hand, when the control unit 110 determines that toner deposit is set to be increased (step S25: YES), the control unit 110 determines whether the color in which the toner deposit is set to be increased and the color of the patch image to be generated are the same color in the subsequent step S26. When the control unit 110 determines that the colors are not the same (step S26: NO), the control section 110 proceeds to the above mentioned step S23.

On the other hand, when the control unit 110 determines that the color in which the toner deposit is set to be increased and the color of the patch image to be generated are the same color (step S26: YES), the control unit 110 determines to broaden the paper interval in the subsequent step S27 and ends the processing.

Next, the patch image generation processing performed in the image forming apparatus 1 will be described by using FIG. 10.

First, in step S31, when the control unit 110 determines whether paper interval is broadened or not and when the paper interval is not broadened (step S31: NO), the control unit 110 performs generation and reading of a patch image having normal toner deposit in the subsequent step S32 and ends the processing.

On the other hand, when the control unit 110 determines that the paper interval is broadened (step S31: YES), the control unit 110 determines whether imaging of a toner image (print image) before the patch image is completed or not in the subsequent step S33. When the control unit 110 determines that the imaging of the toner image (print image) before the patch image is not completed (step S33: NO), the processing of step S33 is repeated.

On the other hand, when the control unit 110 determines that the printing of the print image is completed (step S33: YES), the control unit 110 changes the high pressure output to switch the setting of toner deposit to a normal state from the increased state in the subsequent step S34. The above step S34 is the toner deposit changing processing for returning the toner deposit to a predetermined standard value.

Next, the control unit 110 waits for change in high pressure output in the subsequent step S35.

Next, the control unit 110 generates and reads the patch image in step S36.

Next, the control unit 110 changes the high pressure output to return the setting of toner deposit to the increased state in step S37.

Next, the control unit 110 waits for change in high pressure output in step S38 and ends the processing.

As described above, the image forming apparatus 1 of this embodiment includes the image forming unit 40 which performs image forming on papers and generates a patch image for image density detection so as to be disposed between toner images of images to be formed consecutively on the intermediate transfer belt, the patch density sensor 61 which detects density of the patch image, the print control unit 300 which compares the detected density of the patch image which is detected by the patch density sensor 61 and the aimed density of the patch image which is set in advance and performs the correction processing so that the detected density and the aimed density match each other, the control unit 110 which controls toner deposit when image forming is performed by the image forming unit 40 and the control unit 110 which controls the interval between papers to be conveyed consecutively. Further, when a patch image is to be generated when setting of toner deposit is changed so as to be greater than a predetermined standard value, the control unit 110 executes the paper interval broadening processing to make the interval between papers to be conveyed consecutively longer and executes the toner deposit changing processing to return the setting of toner deposit to the predetermined standard value.

Therefore, even when the image density is increased, the image quality stabilizing correction processing can be performed appropriately. Thus, stability in image quality can be assured.

Moreover, according to the image forming apparatus 1 of this embodiment, the control unit 110 can change the toner deposit for each toner color.

Therefore, user's demand to realize different color reproduction can be handled more adequately.

Moreover, according to the image forming apparatus 1 of this embodiment, the control unit 110 executes the paper interval broadening processing and the toner deposit changing processing only when the image forming unit 40 generates a patch image in the color same as the color in which the toner deposit is set to be greater than a predetermined standard value.

Therefore, only when a patch image which falls outside of the sensitivity region of the patch density sensor 61 because its density is too dense (an appropriate correction processing cannot be performed) is to be generated, the paper interval broadening processing and the toner deposit changing processing are executed. Thus, decrease in productivity can be inhibited as much as possible.

Here, in the above described first embodiment, an example where the control unit 110 execute the paper interval broadening processing and the toner deposit changing processing only when a patch image in the color same as the color in which the toner deposit is set to be greater than a predetermined standard value is to be generated is described. However, the paper interval broadening processing and the toner deposit changing processing may be executed when the toner deposit of at least one color of YMCK is set to be greater than a predetermined standard value.

[Second Embodiment]

Next, the second embodiment of the present invention will be described concentrating on the aspects which are different from the first embodiment.

Here, same symbols are used for the configurations which are similar to those in the first embodiment, and the descriptions will be omitted.

Figure 11:
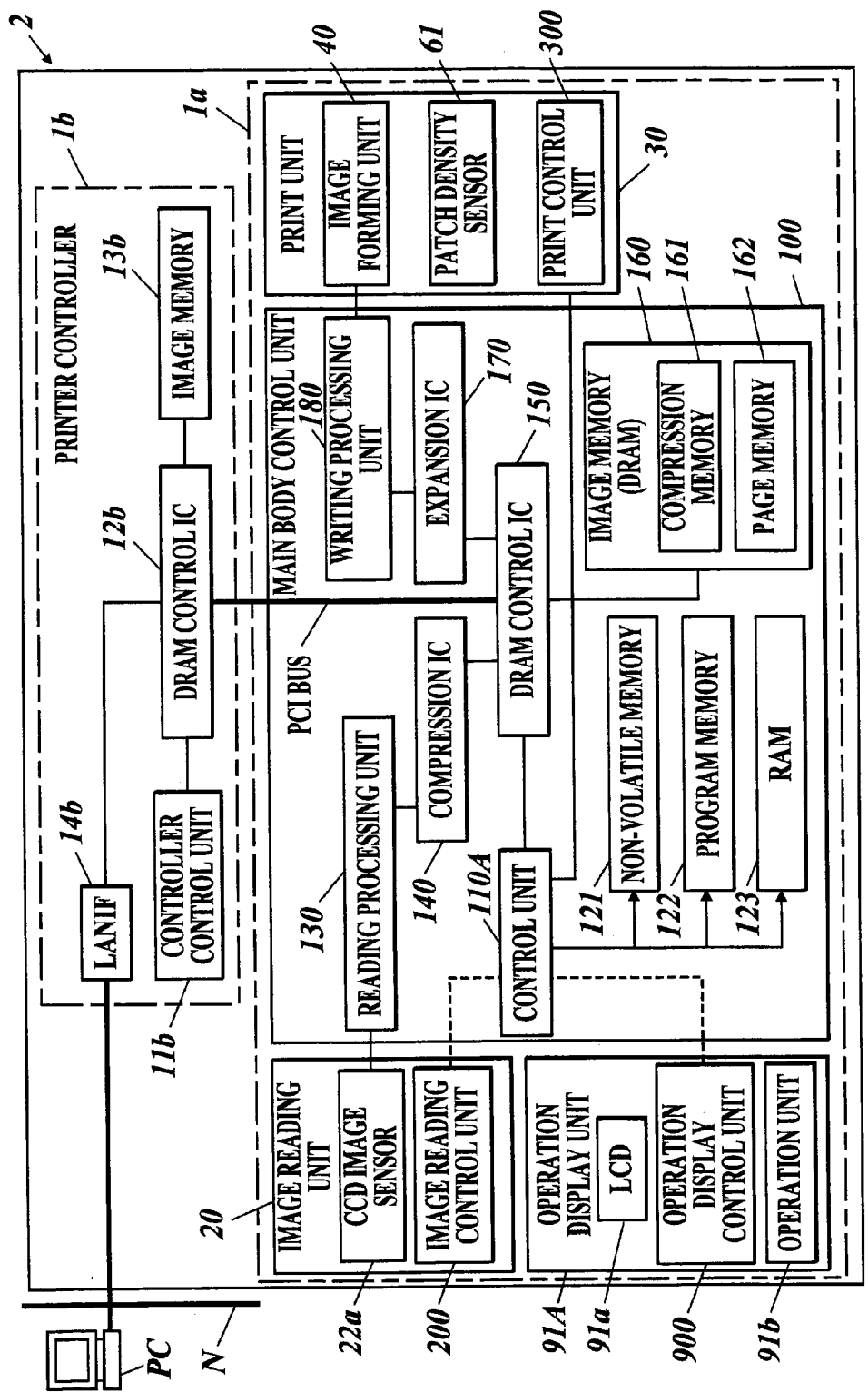
FIG. 11 is a block diagram showing a control structure of an image forming apparatus according to the second embodiment.

In the image forming apparatus 2 of this embodiment (see FIG. 11), when a user sets toner deposit to be greater than a predetermined standard value in the operation display unit 91A, a user can selectively set the correction processing to be prohibited.

In particular, when a user carries out the setting to increase toner deposit with respect to any of Y, M, C and K (or all of them) in the toner deposit setting screen G2, a selection screen (omitted in the drawing) for selecting whether the correction processing with respect to the color in which the toner deposit is set to increase is to be prohibited or not is displayed in the LCD 91a, and by operating this selection screen, the prohibition of correction processing is set.

Further, when the prohibition of correction processing is set, a message for informing that the patch image will not be generated is displayed in the LCD 91a.

In such way, when toner deposit is set at high value than a predetermined standard value, the operation display unit 91 functions as a setting unit for setting the prohibition of correction processing.

Moreover, when the prohibition of correction processing is set in the operation display unit 91, the LCD 91a functions as an informing unit to inform that the patch image will not be generated.

Further, when the prohibition of correction processing is set in the operation display unit 91A, the control unit 110A does not execute the paper interval broadening processing and the toner deposit changing processing which are processing for appropriately carrying out the correction processing.

Here, in this embodiment, the paper interval broadening processing and the toner deposit changing processing are also executed and the correction processing is also carried out when the prohibition of correction processing is not set in the operation display unit 91A.

By having the above configuration, when it is considered that the correction processing is not necessary according to the environment in which the image forming apparatus 2 is set, the condition of the image forming apparatus 2 and so forth, the correction processing can be canceled. Thus, productivity can be maintained.

However, when the correction processing is not performed for a long period of time, there is a possibility that the image quality varies greatly. Therefore, when prohibition of the correction processing is set, image forming (forming of print image) on papers by the image forming unit 40 may be stopped periodically, and a patch image can be generated (perform correction processing) during this periodic stop period of the image forming.

Here, the stop timing can be the timing when the image forming apparatus 2 output the number of prints preset by a user, for example, or may be the timing when the image forming apparatus 2 automatically determines according to operation environment in conformity with a predetermined standard.

Here, operation of the image forming apparatus 2 will be described by using FIG. 12.

Figure 12:
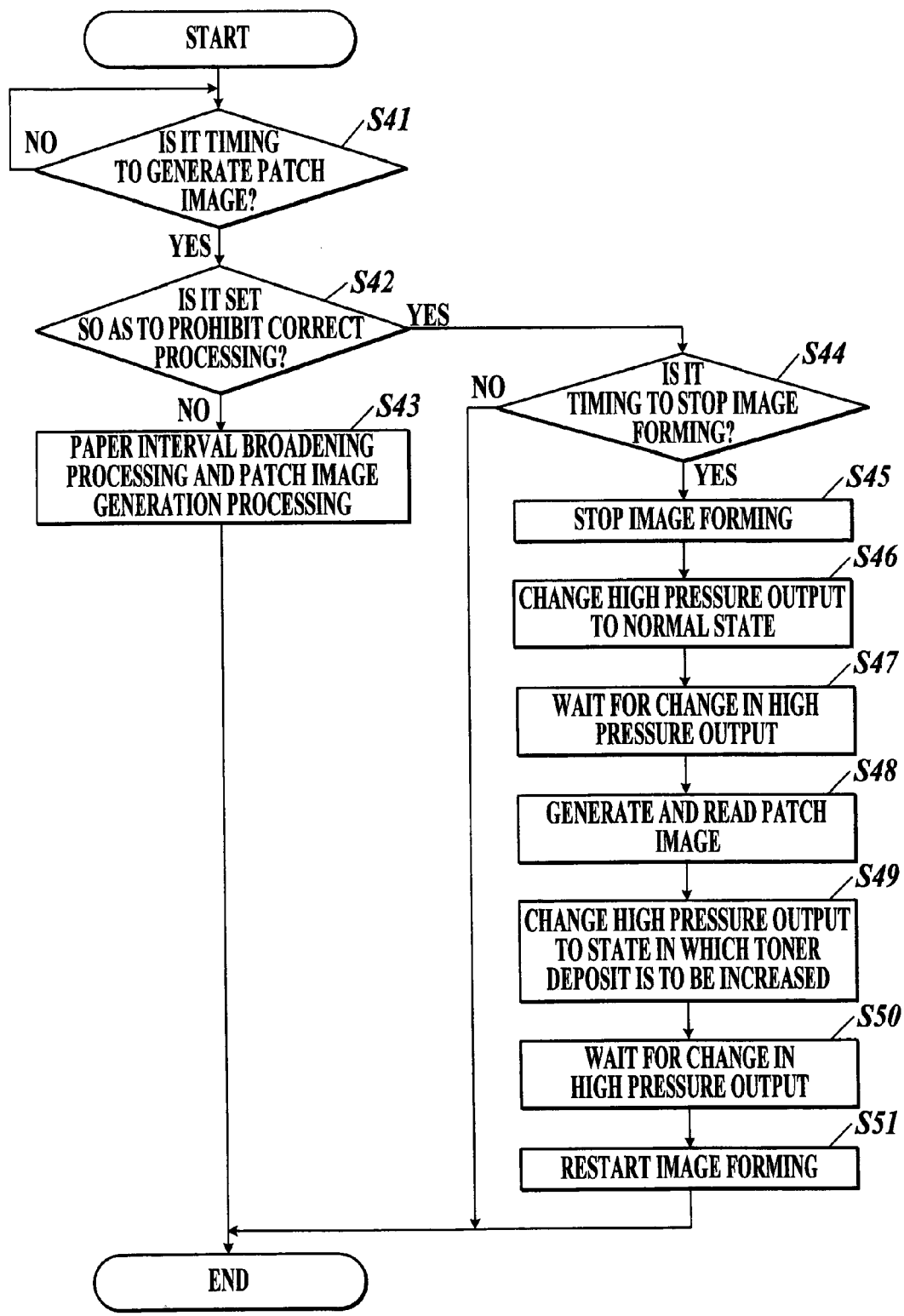
FIG. 12 is a flowchart showing patch image generation determination processing.

Here, it is assumed that the operation shown in FIG. 12 is executed in the control unit 110A.

First, in step S41, the control unit 110A determines whether it is the timing to generate a patch image. When the control unit 110A determines that it is not the timing to generate a patch image (step S41: NO), step S41 is repeated.

On the other hand, when the control unit 110 determines that it is the timing to generate a patch image (step S41: YES), the control unit 110A determines whether prohibition of correction processing is set in the subsequent step S42.

Then, when the control unit 110A determines that prohibition of correction processing is not set (step S42: NO), the control unit 110A executed the paper interval broadening processing and the patch image generation processing which are described in the first embodiment in the subsequent step S43 and ends the processing.

On the other hand, when the control unit 110A determines that prohibition of correction processing is set (step S42: YES), the control unit 110A determines whether it is the timing to stop the image forming to papers in the subsequent step S44. When the control unit 110A determines that it is not the timing to stop the image forming to the papers (step S44: NO), the control unit 110A ends the processing.

On the other hand, when the control unit 110A determines that it is the timing to stop the image forming to the papers (step S44: YES), the control unit 110A stops the image forming to the papers in the subsequent step S45 and proceeds to steps S46 to S50. Here, steps S46 to S50 show the processing similar to the processing shown in steps S34 to S38 of FIG. 10. Therefore, the description will be omitted.

Next, in step S51, the control unit 110A restarts the image forming to the papers and ends the processing.

As described above, it is needless to say that the same advantages as in the first embodiment can be obtained in this embodiment. Further, according to this embodiment, when toner deposit is set to be greater than a predetermined standard value, prohibition of correction processing can be set with respect to the color to which the toner deposit is set to be greater than a predetermined standard value.

Therefore, when it is considered that the correction processing is not necessary due to the environment in which the image forming apparatus 2 is set or the condition of the image forming apparatus 2, the correction processing can be canceled, and the productivity can be maintained.

Moreover, according to this embodiment, when the prohibition of correction processing is set, the control unit 110A can set so as to stop the image forming periodically, and the control unit 110A can set so as to generate a patch image to which the prohibition correction processing is set during the periodic stop period of the image forming.

Therefore, even when correction processing during the image forming of print images is prohibited, the correction processing can be executed during the periodical stop period of the image forming. Therefore, image quality can be prevented from varying greatly.

Here, in the second embodiment, the configuration may be such that the prohibition of correction processing is set for black color or for the colors other than black. In particular, the configuration may be such that when toner deposit is changed only with respect to black toner, generation of black patch image is prohibited, and on the other hand, when toner deposit is changed at least one color (at least one color among YMC) other than black, generation of patch images of all the colors other than black is prohibited.

Moreover, the image forming (forming of print images) to papers by the image forming unit 40 can be stopped periodically, and generation of a patch image (correction processing) of the color in which correction processing is prohibited (K or YMC) can be carried out during the periodic stop period of the image forming.

In such configuration, color balance of YMC can be prevented from being imbalanced.

According to one aspect of the preferred embodiments of the present invention, an image forming apparatus includes an image forming unit which performs image forming on a paper, an image carrier on which a toner image is formed by the image forming unit, a patch image generation unit which generates a patch image for image density detection so as to be disposed between toner images of images formed consecutively on the image carrier, a patch density sensor which detects a density of the patch image generated by the patch image generation unit, a correction unit which performs correction processing to match a detected density and an aimed density by comparing the detected density of the patch image detected by the patch density sensor and the aimed density of the patch image which is set in advance, a toner deposit control unit which controls a toner deposit when the image forming unit performs image forming and a paper interval control unit which control an interval between consecutive papers, and in a case where the patch image generation unit generates the patch image when the toner deposit is changed to be greater than a predetermined standard value, the paper interval control unit executes a paper interval broadening processing to make the interval between consecutively conveyed papers be longer than a standard interval, the image forming unit makes an interval between the toner images of images formed consecutively on the image carrier be longer than a standard interval, and the toner deposit control unit executes a toner deposit changing processing to return the toner deposit to a predetermined standard value.

According to the embodiments, even when the image density is increased, the image quality stabilizing correction can be performed appropriately. Thus, stability in image quality can be assured.

According to one aspect of the preferred embodiments of the present invention, the image forming apparatus further includes a setting unit which sets the correction processing to be prohibited when the toner deposit is greater than a predetermined standard value and an informing unit which informs that the patch image is not to be generated when the setting unit sets the correction processing be prohibited, and when the setting unit sets the correction processing be prohibited, the paper interval control unit does not execute the paper interval broadening processing and the toner deposit control unit does not executed the toner deposit changing processing.

According to the embodiment, when it is considered that the correction processing is not necessary according to the environment in which the image forming apparatus is set, the condition of the image forming apparatus and so forth, the correction processing can be canceled. Thus, productivity can be maintained.

According to one aspect of the preferred embodiments of the present invention, the image forming unit periodically stops the image forming when the setting unit sets the correction processing be prohibited, and the patch image generation unit generates the patch image during a periodic stop period of the image forming.

According to the embodiments, even when correction processing during the image forming of print images is prohibited, the correction processing can be executed during the periodical stop period of the image forming. Therefore, image quality can be prevented from varying greatly.

According to one aspect of the preferred embodiments of the present invention, the toner deposit control unit changes the toner deposit for each color.

According to the embodiments, user's demand to realize different color reproduction can be handled more adequately.

According to one aspect of the preferred embodiments of the present invention, only when the patch image generation unit generates the patch image in a color same as a color in which the toner deposit is set to be greater than a predetermined standard value, the paper interval control unit executes the paper interval broadening processing and the toner deposit control unit executes the toner deposit changing processing.

According to the embodiments, only when a patch image which falls outside of the sensitivity region of the patch density sensor because its density is too dense (an appropriate correction processing cannot be performed) is to be generated, the paper interval broadening processing and the toner deposit changing processing are executed. Thus, decrease in productivity can be inhibited as much as possible.

According to one aspect of the preferred embodiments of the present invention, when the toner deposit is changed only with respect to a black toner by the toner deposit control unit, the patch image generation unit prohibits generation of a black patch image, and when the toner deposit is changed with respect to at least one color of toner other than black by the toner deposit control unit, the patch image generation unit prohibits generation of patch images of all colors.

According to the embodiments, color balance of YMC can be prevented from being imbalanced.

According to one aspect of the preferred embodiments of the present invention, when the patch image generation unit stops generation of the patch image of at least one of black or all colors other than black, the image forming unit periodically stops the image forming, and the patch image generation unit generates the black patch image or the patch images of all colors other than black during a periodic stop period of the image forming.

According to the embodiments, color balance of YMC can be prevented from being imbalanced.

The present U.S. patent application claims a priority under the Paris Convention of Japanese paten application No. 2011-054107 filed on Mar. 11, 2011, which shall be a basis of correction of an incorrect translation.

What is claimed is:
1. An image forming apparatus, comprising:
   an image forming unit which forms an image on a paper based on image data;
   an image carrier on which a toner image is formed by the image forming unit;

a patch image generation unit which generates a patch image for image density detection disposed between toner images of images formed consecutively on the image carrier;

a patch density sensor which detects a density of the patch image generated by the patch image generation unit;

a correction unit which performs correction processing to match a detected density and a target density by comparing the detected density of the patch image detected by the patch density sensor and the target density of the patch image which is set in advance;

a toner deposit control unit which controls a toner deposit when the image forming unit forms the image based on the image data and when the patch image generation unit generates the patch image; and a paper interval control unit which controls an interval between consecutive papers, wherein in a case in which the toner deposit has been changed to be greater than a predetermined standard value and the patch image is to be generated by the patch image generation unit, the paper interval control unit executes a paper interval broadening processing to make the interval between consecutively conveyed papers be longer than a standard interval, and the toner deposit control unit executes a toner deposit changing processing to return the toner deposit to the predetermined standard value so that the patch image is formed with the predetermined standard value of the toner deposit.

2. The image forming apparatus of claim 1, further comprising:

a setting unit which sets the correction processing to be prohibited when the toner deposit is greater than the predetermined standard value; and an informing unit which informs that the patch image is not to be generated when the setting unit sets the correction processing be prohibited, wherein when the setting unit sets the correction processing be prohibited, the paper interval control unit does not execute the paper interval broadening processing and the toner deposit control unit does not execute the toner deposit changing processing.

3. The image forming apparatus of claim 2, wherein the image forming unit periodically stops operation when the setting unit sets the correction processing to be prohibited, and the patch image generation unit generates the patch image during a periodic stop period of the image forming unit.

4. The image forming apparatus of claim 1, wherein the toner deposit control unit changes the toner deposit for each color.

5. The image forming apparatus of claim 4, wherein the paper interval control unit is controlled to execute the paper interval broadening processing and the toner deposit control unit is controlled to execute the toner deposit changing processing only when the patch image generation unit generates the patch image in a same color as a color in which the toner deposit is set to be greater than the predetermined standard value.

6. The image forming apparatus of claim 4, wherein when the toner deposit is changed only with respect to a black toner by the toner deposit control unit, the patch image generation unit prohibits generation of a black patch image, and when the toner deposit is changed with respect to at least one color of toner other than black by the toner deposit control unit, the patch image generation unit prohibits generation of patch images of all colors.

7. The image forming apparatus of claim 6, wherein when the patch image generation unit stops generation of the patch image of at least one of black or all colors other than black, the image forming unit periodically stops operation, and the patch image generation unit generates the black patch image or the patch images of all colors other than black during a periodic stop period of the image forming unit.

* * * * *